UNITED STATES PATENT OFFICE.

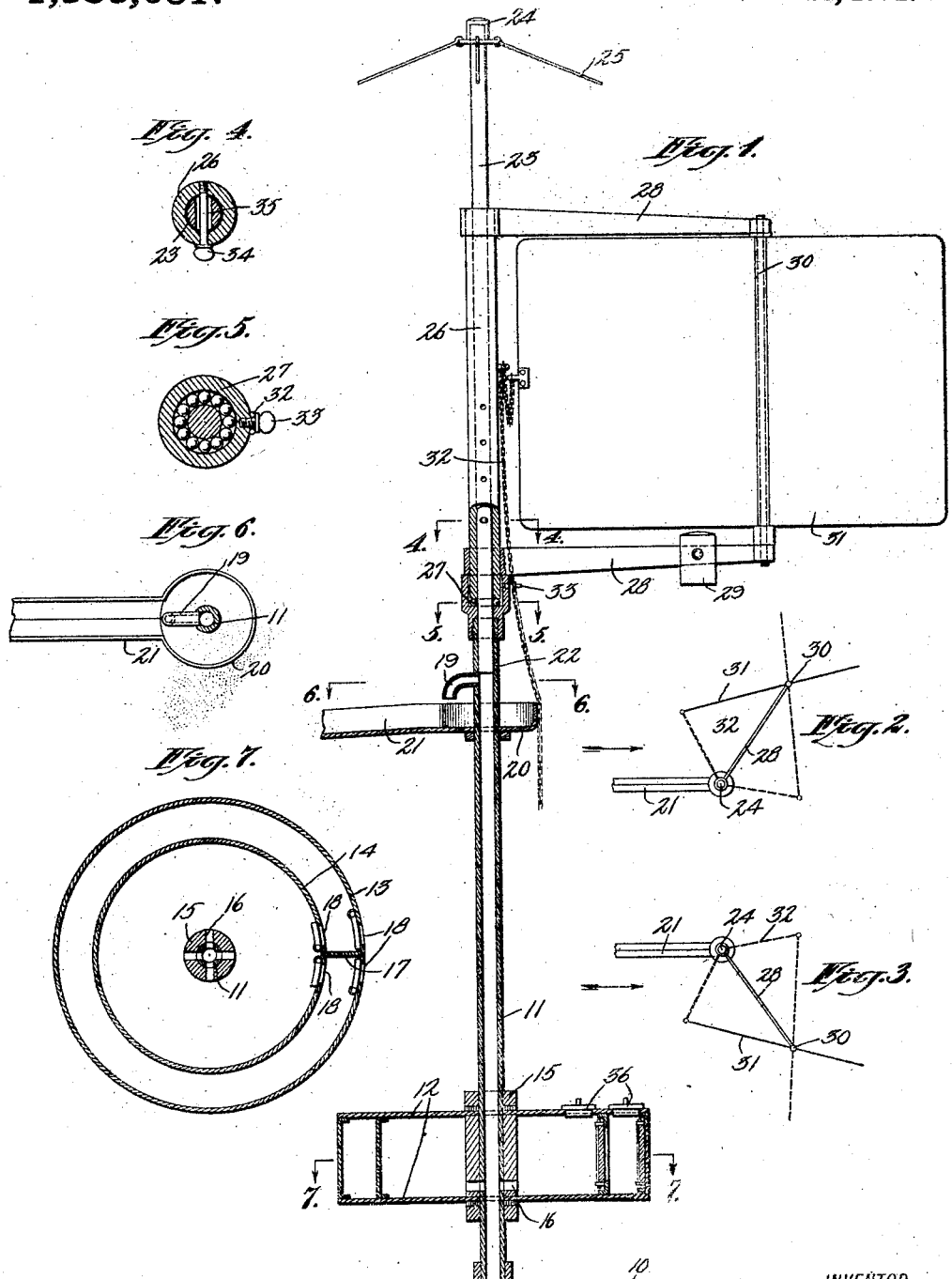

EDWARD E. SCHUMAKER, OF HILBERT, WISCONSIN.

WATER-ELEVATING UNIT.

1,383,031.  Specification of Letters Patent.  Patented June 28, 1921.

Application filed March 9, 1920. Serial No. 364,463.

*To all whom it may concern:*

Be it known that I, EDWARD E. SCHUMAKER, a citizen of the United States, and resident of Hilbert, county of Calumet, State of Wisconsin, have invented certain new and useful Improvements in Water-Elevating Units, of which the following is a specification.

This invention relates to a water elevating unit and aims more particularly to provide such a unit including a pump and a driving medium therefor.

Various attempts have been made to utilize wind motors for operating pumps particularly designed to drain low lying ground, but the units heretofore employed have proven more or less impractical in that the pump has not been ideally designed with a view of requiring a minimum of operating energy to elevate a large amount of water, which is essential, as a pump of this nature providing drainage for the surface water of low lying ground must operate at all times if it is to accomplish any practical purpose.

In these units heretofore provided where a wind motor has been relied upon to furnish the energy necessary to operate the pump the latter has ceased to function upon the wind current becoming weak, for which reason attempts to drain the surface of water from low grounds by means of wind driven motors have been abandoned.

Having these defects in mind I have constructed a wind motor more particularly designed to operate in conjunction with a particular kind of pump, which wind motor will function in the most variable and lightest of breezes.

A further object of my invention is the construction of a pump designed more particularly to operate in conjunction with my improved type of wind motor, which pump will be capable of elevating a great amount of water with the expenditure of a minimum amount of driving force.

A still further object of my invention is the construction of a pump, which not alone shall be capable of draining surface water from low lying ground but by means of which it will be possible to under-drain such ground.

From the above it will be seen that I provide a unit equally adapted to drainage and irrigation work, which unit when once adjusted shall be entirely automatic in operation with the exception that attention will be required when it is desired to bring the same to a stop.

Reference is had to the attached sheet of drawings as illustrating one practical embodiment of my invention, and in which drawings—

Figure 1 is a partly sectional side view of a unit constructed in accordance with my invention and showing both the motor and pump;

Figs. 2 and 3 illustrate the various positions of the working parts of said motor;

Fig. 4 is a sectional view taken in the direction of the arrows along lines 4—4 of Fig. 1;

Fig. 5 is a similar section but taken along line 5—5 of Fig. 1;

Fig. 6 is a sectional view taken along line 6—6 of Fig. 1 and showing a convenient form of water outlet, and Fig. 7 is a sectional plan view taken in the direction of the arrows along line 7—7 of Fig. 1, and showing the details of the pump construction.

In all of these views like reference numerals designate similar parts and the reference numeral 10 indicates a base of any desired construction upon which is rotatably mounted a tube 11. Mounted upon such tube at a point adjacent its lower end is my improved type of pump, preferably taking the form of a pair of spaced disks 12, adjacent the outer edges and between which there extends an annular side wall such as 13. Spaced from such side wall and inclosed within the same is a second annular member 14. A hub such as 15 encircles the tube 11 and serves to mount and retain the pump in applied position. The hub 15 is formed with openings 16 alining at one of their ends with openings formed through the tube 11, their opposite ends communicating with the space inclosed by the inner annular member 14.

A partition wall 17 extends between the side wall 13 and annular member 14 and these portions are formed adjacent such partition wall with openings 18, the flow of fluid through said openings being controlled by means of valves conveniently taking the form of gate-valves, hingedly connected to the side wall 13 and annular member 14 along their side edges most remote from the partition wall 17.

The tube 11 adjacent its upper end is formed with a further opening with which there is associated a spout 19 conveniently overlying a fluid receiving trough 20, connected with a runway such as 21.

Extending into the tube and fixedly secured thereto by any suitable means such as a transversely extending pin 22, is a shaft such as 23, the upper end of which may conveniently project into and be steadied by a cap such as 24, held in position by means of brace rods or cables 25.

Encircling the shaft 23 and rotatable with respect thereto is a collar 26 the lower end of which is rotatably supported by any suitable means such as a cup 27 secured to the upper end of the tube 11 and being formed with a ball race adapted to receive balls interposed between such cup member 27 and the lower edge of the collar 26.

Secured to the collar 26 and extending outwardly therefrom at right angles are arms such as 28, one of which arms may conveniently carry a weight such as 29 for a purpose hereinafter more fully specified.

A rotatable shaft 30 extends between the outer ends of the arms 28 and serves to swingingly mount a vane such as 31, it being noted that the greater amount of area of such vane extends between the collar 26 and the shaft 30. A restraining member such as a chain 32 has one of its ends attached to the inner edge of the vane 31, the chain or other restraining member being secured in position by any suitable means such as a pin 33. This restraining member serves to limit the arc through which the inner edge of the vane 31 is capable of swinging and it will be appreciated that this arc may be varied to secure the proper adjustment of the swinging motion desired.

In operation it will now be noted, assuming that the air current is flowing in the direction of the arrows in Figs. 2 and 3, that the arms 28 will be oscillated through an arc, as has been shown, by virtue of the fact that the vane, upon reaching the point indicated in Fig. 2 will swing to the position indicated by dotted lines thus presenting its face broadside to the direction of the air current.

When the opposite limit of swing of the arms 28, illustrated in Fig. 3, has been reached, or in other words, the inner edge of the vane passed to a point at which its opposite face is slightly presented to the wind currents, the vane will be snapped into the position indicated by dotted lines in Fig. 3, thus again presenting the broadside of its opposite face to the air currents. This results in a moving of the arms 28 back to the position indicated in Fig. 2 and this operation, as will be readily appreciated, is continued, the arms swinging so as to at all times present the broadside of the vane 31 to the air currents. This function might readily be likened to that of a sailing vessel when it is performing the maneuver commonly known as "tacking" and in which the main sail swings, such swinging being limited by any suitable means.

It will be appreciated that a connection must be provided between the collar 26 and shaft 23, and this connection conveniently includes a pin such as 34 which passes through the said collar and through an opening of comparatively large bore 35, formed in the shaft 23.

It will now be seen that the arms 28 will be continuously oscillated and that by virtue of the restraining member 32 the swinging motion of the vane 31 may be adjusted with that degree of nicety which will insure the production of a maximum amount of power on the part of my improved type of motor.

The swing of the arms 28 will be considerably increased by means of the weight 29 mounted thereon, which weight 29 may be adjusted to a position farther away from or nearer to the axis of rotation of the collar 26.

It will now be seen that by means of the peculiar form of connection provided between the collar 26 and the shaft 23 that a reversal of rotation of the collar 26 will not be imparted to the shaft 23 until the collar 26 has acquired sufficient momentum to insure the carrying of the arms 28 beyond dead center and to a point at which the vane 31 will automatically present its opposite face broadside to the air currents. The oscillation of the shaft 23 will be imparted by means of the pins 22 to the tube 11 and this tube will in turn impart motion to my improved type of pump which is submerged beneath the surface of the water to be drained. It will be noted that the valves of the pump associated with both the side wall 13 and annular member 14 will open, permitting the rising of water into said pump and tube 11 to a height corresponding to the surface of the water outside of the same.

It will further be appreciated that the same amount of air will remain within the pump between the upper disk and upper surface of the water within the same.

Now assuming that the pump is oscillated, it will be seen that upon the pump beginning to move in an opposite direction, which motion will be transmitted to the same with more or less of a snapping action due to a connection between the collar 26 and the shaft 23, the water will dash through the space between the members 13 and 14 and against the partition walls 17, at the same time bearing against the outer face of the annular member 14, which will result in an opening of that valve 18 of the annular member 14 adjacent that face of the partition wall against which the water is thrown. The water moving in the manner indicated will produce a suction within the opposite end of the space between the members 13 and 14, which will result in the tight closing of a valve associated with the inner member and the opening of the valve 18 mounted upon the side wall 13, thus admitting an additional amount of water. It will be noted that this action will be continued as long as the arms 28 are oscillated and these arms may be brought to a standstill by a pull being exerted upon the restraining member 32, preventing a farther swinging of the vane 31.

For the purpose of inspection the pump may be formed with screw-caps such as 36 in the face of the upper disk 12, permitting an inspection of the valves 18.

Obviously, numerous modifications of structure might be resorted to without departing from the scope of my claim, which reads as:

I claim:

A water elevating unit including a tube, a pump attached to said tube and means for oscillating said pump, said pump including a pair of spaced disks, annular walls extending between said disks and spaced from one another, a partition extending between said annular walls and valves associated with openings formed in said annular walls adjacent said partition.

EDWARD E. SCHUMAKER.